United States Patent
Thiriet et al.

(10) Patent No.: US 12,012,214 B2
(45) Date of Patent: Jun. 18, 2024

(54) HYBRID PROPULSION SYSTEM FOR VERTICAL TAKE-OFF AND LANDING AIRCRAFT

(71) Applicant: SAFRAN HELICOPTER ENGINES, Bordes (FR)

(72) Inventors: Romain Jean Gilbert Thiriet, Moissy-Cramayel (FR); Stéphane Meyer Beddok, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 325 days.

(21) Appl. No.: 17/609,060

(22) PCT Filed: May 5, 2020

(86) PCT No.: PCT/FR2020/050747
§ 371 (c)(1),
(2) Date: Nov. 5, 2021

(87) PCT Pub. No.: WO2020/225510
PCT Pub. Date: Nov. 12, 2020

(65) Prior Publication Data
US 2022/0185489 A1 Jun. 16, 2022

(30) Foreign Application Priority Data
May 6, 2019 (FR) ...................... 1904715

(51) Int. Cl.
*B64D 27/02* (2006.01)
*B60L 50/40* (2019.01)
(Continued)

(52) U.S. Cl.
CPC ............. *B64D 27/02* (2013.01); *B60L 50/40* (2019.02); *B60L 50/50* (2019.02); *B64C 29/00* (2013.01);
(Continued)

(58) Field of Classification Search
CPC ...................... B64D 2027/026; B64D 2221/00
(Continued)

(56) References Cited

U.S. PATENT DOCUMENTS 10,035,604 B2 * 7/2018 Bak ...................... B64C 29/0033
10,351,238 B2 * 7/2019 McAdoo ............... B64C 39/024
(Continued)

FOREIGN PATENT DOCUMENTS

CN 106394910 A 2/2017
CN 106536895 A 3/2017
(Continued)

OTHER PUBLICATIONS

French Search Report Issued in FR1904715 on Jan. 23, 2020 (2 pages).
(Continued)

*Primary Examiner* — Christopher P Ellis
(74) *Attorney, Agent, or Firm* — Bookoff McAndrews, PLLC

(57) ABSTRACT

A hybrid propulsion system for a vertical take-off and landing aircraft comprising at least one combustion engine driving an electricity generator, at least one electrical energy storage assembly associated with each electricity generator and defining, with each electricity generator, an energy branch, a plurality of electric motors actuating a same plurality of rotors providing together the propulsion and/or the lift of the aircraft, and an electrical power and distribution unit supplying power to the plurality of electric motors from the electricity generator and/or from the electrical energy storage assembly according to a pre-established flight phase, the system including at least two energy branches having an asymmetric configuration and each supplying power selectively, by means of the electrical power and distribution unit, all or part of the plurality of (Continued)

electric motors, and in that the electricity generators of the combustion engines have between them a power ratio comprised between.

11 Claims, 2 Drawing Sheets

(51) Int. Cl.
    *B60L 50/50*         (2019.01)
    *B64C 29/00*         (2006.01)
    *B64D 27/04*         (2006.01)
    *B64D 27/10*         (2006.01)
    *B64D 27/24*         (2024.01)

(52) U.S. Cl.
    CPC ............ *B64D 27/04* (2013.01); *B64D 27/10* (2013.01); *B64D 27/24* (2013.01); *B60L 2200/10* (2013.01); *B60L 2210/30* (2013.01); *B60L 2210/40* (2013.01); *B64D 27/026* (2024.01); *B64D 2221/00* (2013.01)

(58) Field of Classification Search
    USPC .......................................................... 244/55
    See application file for complete search history.

(56) References Cited

U.S. PATENT DOCUMENTS

| | | | |
|---|---|---|---|
| 10,814,991 B2 * | 10/2020 | Shah | ..................... B64D 27/24 |
| 2010/0126178 A1 | 5/2010 | Hyde et al. | |
| 2013/0147204 A1 | 6/2013 | Botti et al. | |
| 2014/0290208 A1 | 10/2014 | Rechain et al. | |
| 2016/0280386 A1 * | 9/2016 | Mestler | ................. B64C 39/024 |
| 2017/0029131 A1 | 2/2017 | Steinwandel et al. | |
| 2017/0226933 A1 | 8/2017 | Klonowski et al. | |
| 2018/0187604 A1 | 7/2018 | Poumarede et al. | |

FOREIGN PATENT DOCUMENTS

| | | | | |
|---|---|---|---|---|
| CN | 110116812 A | * | 8/2019 | .............. B60L 50/40 |
| DE | 102010021026 A1 | | 11/2011 | |
| EP | 3564122 A1 | * | 11/2019 | .............. B64C 27/28 |
| EP | 3318492 B1 | * | 12/2019 | .............. B63H 21/17 |
| EP | 3369655 B1 | * | 1/2020 | .............. B64C 27/28 |
| EP | 3650351 A1 | * | 5/2020 | .............. B60L 53/24 |
| EP | 3650350 B1 | * | 5/2023 | .............. B64D 27/02 |
| FR | 3056555 A1 | | 3/2018 | |
| FR | 3092926 A1 | * | 8/2020 | .............. B64D 27/24 |
| WO | 2013/017680 A1 | | 2/2013 | |
| WO | 2016/020607 A1 | | 2/2016 | |
| WO | WO-2016093905 A1 | * | 6/2016 | .......... B64C 11/001 |
| WO | 2017/009037 A1 | | 1/2017 | |
| WO | WO-2018175349 A1 | * | 9/2018 | ......... B64C 29/0008 |

OTHER PUBLICATIONS

International Search Report issued in PCT/FR2020/050747 on Sep. 11, 2020 with English Translation (2 pages).
Written Opinion of the International Searching Authority issued in PCT/FR2020/050747 (10 Pages).

* cited by examiner

[Fig. 1]
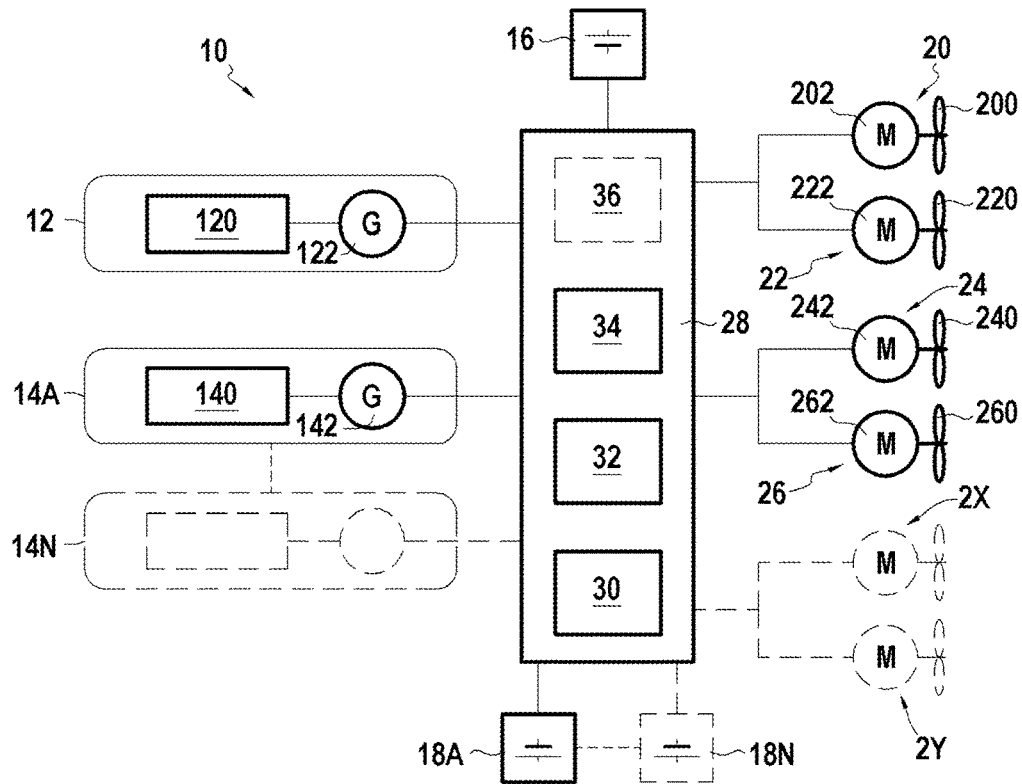
[Fig. 2]
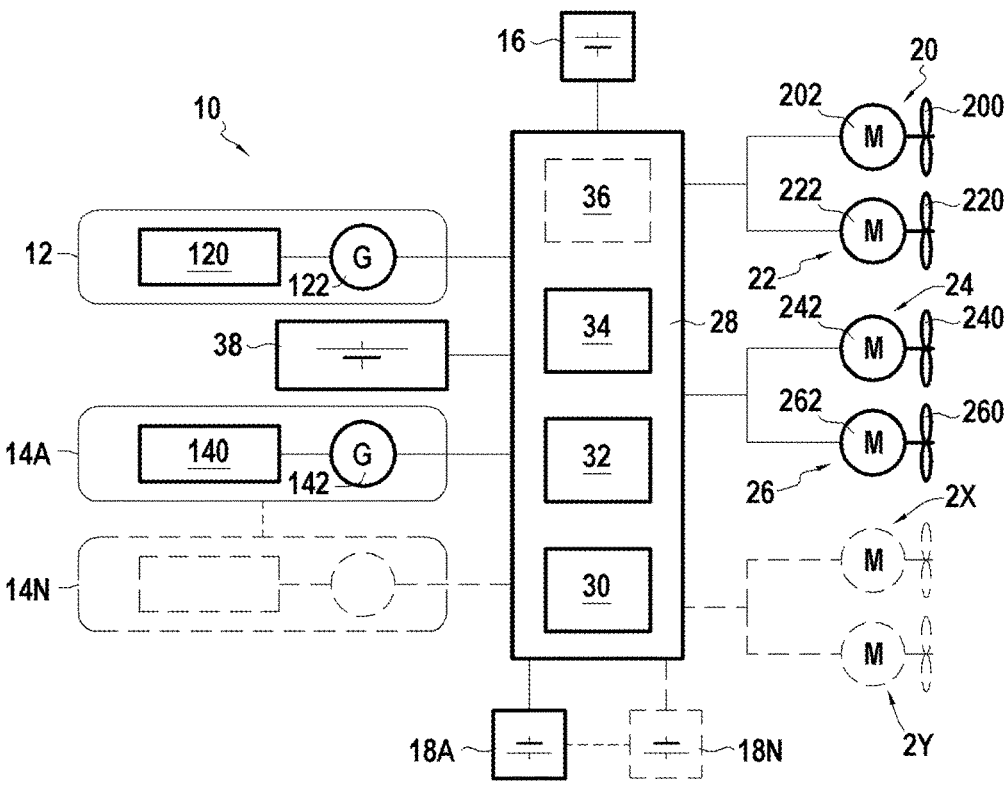

[Fig. 3]
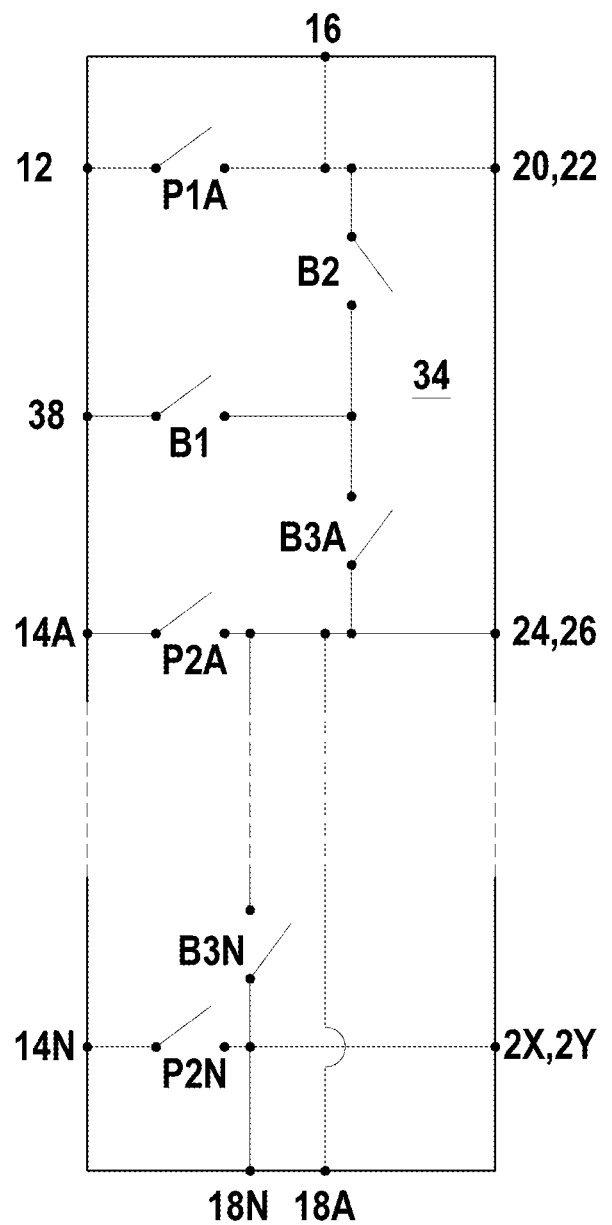

HYBRID PROPULSION SYSTEM FOR VERTICAL TAKE-OFF AND LANDING AIRCRAFT

CROSS-REFERENCE TO RELATED APPLICATIONS

This patent application is the U.S. National Stage entry under 35 U.S.C. § 371 of International Patent Application No. PCT/FR2020/050747, filed on May 5, 2020, which claims the benefit of priority to French Patent Application No. 1904715, filed on May 6, 2019.

TECHNICAL FIELD

The invention relates to a hybrid propulsion system for a vertical take-off and landing aircraft and an aircraft including a system of this type.

PRIOR ART

An architecture for propelling a multi-rotor aircraft is known from application FR3056555 and consists of using a turbine engine, a generator associated with this turbine engine and being able to recharge a battery, and eight electric motors driving eight counter-rotating propellers. The dimensioning of the turbo-generator (turbine engine plus generator) and of the battery is accomplished in such a manner that each member is capable of supplying alone the power necessary for the propulsion of the aircraft, continuously for the turbo-generator and for a few minutes for the battery.

However, the power necessary in cruise in a multi-rotor aircraft of this type being 30 to 40% lower than the maximum power required during takeoff, the turbo generator therefore operates during this cruise phase far from its specific fuel consumption optimum.

In addition, the performance of the propulsion system is very dependent on ambient conditions, on the speed of advance and on the on-board mass of the aircraft. Moreover, besides the fact of on-boarding a considerable mass of batteries, in the event of the loss of the turbo-generator, this architecture only allows an emergency landing in an accessible zone during a limited time, excluding for example maritime over-flight zones.

Thus there currently exists a need for a new propulsion system for a multi-rotor aircraft, more particularly for vertical take-off and landing (VTOL) aircraft with hybrid propulsion.

DISCLOSURE OF THE INVENTION

The invention therefore proposes a hybrid VTOL propulsion architecture which mitigates the preceding disadvantages and allows in particular an increase in versatility as well as an optimization of the production of energy according to the flight phases of the aircraft.

To this end, a hybrid propulsion system for a vertical take-off and landing aircraft is disclosed, comprising at least one combustion engine driving an electricity generator, at least one electrical energy storage assembly associated with each electricity generator and defining, with each electricity generator, an energy branch, a plurality of electric motors actuating a same plurality of rotors providing together the propulsion and/or the lift of the aircraft, and an electrical power and distribution unit supplying power to the plurality of electric motors from the electricity generator and/or from the electrical energy storage assembly according to a pre-established flight phase, the system being characterized in that it includes at least two energy branches having an asymmetric configuration and each supplying power selectively, by means of the electrical power and distribution unit, all or part of the plurality of electric motors and in that the electricity generators of the combustion engines have between them a power ratio comprised between 1.2 and 1.4 so as to allow the more powerful to supply alone the electrical power required for the aircraft in all flight conditions.

Thus, by proposing an architecture including more than one turbo-generator, it is possible to reduce the apparent loss of power seen by the aircraft in the event of total loss of a combustion engine, and to favor multiple power combinations.

Advantageously, each of the electrical energy storage assemblies supplies a determined power able to smooth the power supply to the plurality of electric motors when this plurality of electric motors is supplied with power by the electricity generators and in that it also includes an additional electrical energy storage assembly supplying a determined power corresponding to the power delivered by one of the electricity generators and able to be selectively connected to any one of the at least two energy branches or each of the electrical energy storage assemblies supplies a determined power corresponding to the power delivered by the electricity generator of the combustion engine to which this electrical energy storage assembly is associated.

By thus pooling the additional storage assembly, it is possible to reduce the overall size (and therefore the mass) of the electrical energy storage assemblies, to obtain an operating mode called "economy" in the cruise phase and to allow an emergency reactivation of either of the turbo-generators left in standby mode.

According to an advantageous embodiment, the first electricity generator is able to deliver an electrical power of 400 kW and the second electricity generator is able to deliver an electrical power of 300 kW.

Preferably, the additional electrical energy storage assembly supplies a determined power corresponding to the power delivered by the electricity generator having the lower power.

According to the contemplated embodiment, the electrical energy storage assemblies can be rechargeable.

Advantageously, the electrical power and distribution unit includes AC-DC converters for converting the alternating current delivered by the electricity generators into direct current, DC-AC converters for converting direct current into alternating current for supplying the electric motors, and a contactor array for connecting the electricity generators and/or the electrical energy storage assemblies to the electric thrusters according to the pre-established flight phase.

Preferably, the combustion engine is a gas turbine or any other internal combustion engine of the piston or rotary type driving the electricity generator via a free or linked turbine and the electrical energy storage assembly is a fuel battery or, if it is rechargeable, a battery and/or super-capacitor unit.

The invention also relates to a hybrid VTOL aircraft including a hybrid propulsion system as mentioned previously.

BRIEF DESCRIPTION OF THE DRAWINGS

Other characteristics and advantages of the present invention will be revealed by the detailed description given below, with reference to the following figures devoid of any limiting character and in which:

FIG. 1 illustrates in a simplified manner a first example of an electrical propulsion architecture of a hybrid VTOL aircraft complying with the invention, FIG. 2 illustrates in a simplified manner a second example of an electrical propulsion architecture of a hybrid VTOL aircraft complying with the invention, and FIG. 3 shows an exemplary embodiment of a contactor array implemented in the electrical propulsion system of a hybrid VTOL aircraft complying with the invention.

DESCRIPTION OF THE EMBODIMENTS

FIG. 1 illustrate very schematically a first example of a hybrid propulsion system 10 for a vertical take-off and landing (VTOL) aircraft complying with the invention and including N energy branches, each energy branch comprising an electricity generator with a combustion engine (or turbo-generator 12; 14A, 14N) and an electrical energy storage assembly 16; 18A, 18N, advantageously rechargeable, these N energy branches supplying power selectively to a plurality of electric thrusters 20, 22, 24, 26, 2X, 2Y providing the propulsion and/or the lift of the aircraft.

The preferred system with two propulsive assemblies illustrated in solid lines in FIG. 1 thus defines two energy branches each supplying power to all or part of the electric thrusters. When these two energy branches are segregated, each supplies power to half of these thrusters, i.e. two thrusters each, in the configuration illustrated with four thrusters. The combustion engine 120, 140 supplied with a fuel stored in a reservoir (not shown) is for example a turbomachine (gas turbine or any other internal combustion engine of the piston or rotary type for example) and it drives via a free or linked turbine a generator or an electric starter/generator 122, 142. The electrical energy storage assembly is for example a fuel battery generating this energy from a fuel such as hydrogen which may or may not be used for propulsion or, if it is rechargeable, a battery and/or super-capacitor unit 16, 18A. The electric thrusters each consist of at least one rotor 200, 220, 240, 260 driven by an electric motor 202, 222, 242, 262, possibly through a reduction gear (not shown).

For the simplification of the drawings, two thrusters, each provided with a rotor, are associated with each turbo-generator of an energy branch, but it is understood that the invention applies without distinction to a greater number of thrusters, typically from two to twelve or more for example, the rotor possibly being a simple propeller or a dual concentric propeller of the counter-rotating type, as in the prior art cited in the preamble.

This hybrid propulsion system further includes an electrical power and distribution unit 28 supplying power to the plurality of electric motors 202, 222, 242, 262 from the electricity generator 122, 142 and/or from the electrical energy storage assembly 16, 18A according to the flight phase of the aircraft in question. This unit ensures electrical decoupling between the electricity generators and the electric motors which can then each rotated at their respective nominal rotation speed (the generators generally having much higher rotation speeds than those of the electric motors, which can also rotate at different speeds) to optimize the performance of the aircraft.

Also, conventionally, this unit is provided with AC-DC converters 30 for converting the alternating current delivered by the generators into direct current intended for the DC electrical network of the aircraft, DC-AC converters 32 for converting direct current originating from this DC electrical network into alternating current for supplying power to the electric motors, a contactor array 34 directing the best adapted energy source (generator or electrical energy storage assembly or both) to deliver to the electric thrusters according to the flight plan (mapping of the over-flown zones, environmental conditions), to the take-off mass of the aircraft (number of passengers and freight transported) and to the available energy (energy and fuel resource including regulatory reserves).

Preferably, DC-DC converters 36 can be provided to allow recharging of the electrical energy storage assemblies 16, 18A from the electricity generators, if these are rechargeable (this possibility of recharging is however not practicable with a fuel battery).

With this architecture with two turbo-generators which can if necessary provide segregation of the two energy branches, it is possible to retain residual power longer, in the event of a breakdown of one of the two turbo-generators, the electrical energy storage assembly with this faulty turbo-generator then supplying power to the electric thrusters of the corresponding energy branch. This retention however, is accomplished to the detriment of a mass and fuel consumption penalty with compared to the architecture with a single turbo-generator of the prior art.

It will be noted that the combustion engine can, with this architecture, then have an emergency operating regime available such as the OEI (One Engine Inoperative) type.

A second example of a hybrid propulsion system for a hybrid VTOL aircraft complying with this invention is illustrated in FIG. 2. It is distinguished from the preceding in that it also includes an additional electrical energy storage assembly 38 which allows it to supplement a faulty turbo-generator (thus operating as a pooled emergency battery) of one of the N energy branches, the electrical energy storage assemblies 16; 18A, 18N associated with each of the generators then no longer providing more than simple smoothing of the current for power needs.

This second architecture allows reducing significantly the mass of the electrical energy storage assembly. In fact, considering that each of the generators delivers a power of 300 kW, then a battery supplying the same power is adapted for the additional electrical energy storage assembly 38 and batteries each supplying a power of 50 kW are then sufficient for each of the electrical energy storage assemblies 16; 18A, 18N. This storage configuration with N+1 batteries is to be compared with that resulting from the first architecture, in which the electrical energy storage assemblies 16; 18A, 18N are advantageously obtained with N batteries, each supplying a power of 300 kW.

In addition, in a limited flight and speed domain, this second architecture allows operating at cruise on a single turbo-generator (called "economy" mode), which allows improving the reliability of the aircraft or accomplishing a fuel saving greater than 10%.

In fact, the operation of such an economy mode allows placing one of the two turbo-generators in standby mode (for example, turbo-generator 14A in a configuration with two turbo-generators 12, 14A). The energy necessary for the rapid reactivation in the event of loss of the other of the two turbo-generators, the active turbo-generator 12, is obtained from this additional electrical energy storage assembly 38 by an appropriate action on the contactor array 34 allowing, first of all, isolating the faulty turbo-generator 12, before restarting the standby turbo-generator 14A from this additional assembly 38 to, once the latter is restarted, pursue the flight phase with the turbo-generator 14A thus reactivated.

Moreover, the use of two turbo-generators allows an asymmetric configuration of these two turbo-generators in order to allow broader use in the flight domain of this economy mode.

Thus, the need for power in the cruise phase being dependent on different parameters (outside temperature and pressure, mass of the aircraft, speed . . . ), it can be greater than the power delivered by a single turbo-generator. In this case, a turbo-generator more powerful than the other must be available in order to be able to offer the economy mode in all flight conditions. For example, is one of the two generators delivers a power of 300 kW, the second can then deliver a power of 400 kW. Typically, a power ratio between the two turbo-generators comprised between 1.2 and 1.4 then appears appropriate so as to allow the more powerful to supply alone the electrical power required for the aircraft in all flight conditions.

Advantageously, this economy mode can be accomplished on one or the other of the two turbo-generators (that with the stronger or weaker power) depending on the flight conditions (take-off mass, ambient conditions, . . . ) and can also evolve during the mission. In this case, the additional electrical energy storage assembly 38 will be capable of emergency reactivation of one or the other of the two turbo-generators.

It will be noted that, for a hybrid VTOL aircraft, the activation of this economy mode is preferably accomplished in the cruise phase provided that the two following conditions are verified simultaneously: speed of advance>100 kts and required electrical power for the aircraft can be supplied by a single one of the two turbo-generators (depending on the effective cruise speed and ambient flight conditions (altitude, temperature . . . )).

An exemplary embodiment, which can in no way be considered limiting, of the contactor array 34 implemented in the electric propulsion architecture of a hybrid VTOL aircraft complying with the invention is illustrated in FIG. 3.

An array of this type includes several contactors: N contactors P1A; P2A and P2N are intended, once open, to isolate each of the turbo-generators 12; 14A and 14N and another B1 is intended to do the same with the additional electrical energy storage assembly 38. The other contactors B2; B2A and B3N ensure the segregation of the propulsive assemblies in the open position (for example the turbo-generator 12 supplies only the electric thrusters 20, 22 and the turbo-generator 14N supplies only the electric thrusters 2X, 2Y) and, in the closed position, they allow the restarting of one of the selected turbo-generators from the additional electrical energy storage assembly or even the substitution of one energy branch by another in the event of loss of the turbo-generator of this energy branch.

The invention claimed is:

1. A hybrid propulsion system for a vertical take-off and landing aircraft comprising:
    two energy branches, each having a combustion engine driving an electricity generator and at least one electrical energy storage assembly associated with each electricity generator,
    a plurality of electric motors actuating a same plurality of rotors providing together the propulsion and/or the lift of the hybrid VTOL aircraft, and
    an electrical power and distribution unit supplying power to the plurality of electric motors from the electricity generators and/or from the electrical energy storage assemblies according to a pre-established flight phase, wherein the two energy branches have an asymmetric configuration and each supply power selectively, by means of the electrical power and distribution unit, all or part of the plurality of electric motors and in that the electricity generators of the combustion engines have between them a power ratio comprised between 1.2 and 1.4 so as to allow the more powerful to supply alone the electrical power required for the aircraft in all flight conditions, wherein an additional electrical energy storage assembly supplies a determined power corresponding to the power delivered by one of the electricity generators and is configured to reactivate one of the electricity generators.

2. The hybrid propulsion system according to claim 1, wherein each of the electrical energy storage assemblies supplies a determined power able to smooth the power supply to the plurality of electric motors when this plurality of electric motors is directly supplied with power by the electricity generators and in that it further includes the additional electrical energy storage assembly supplying a determined power corresponding to the power delivered by one of the electricity generators and able to be selectively connected to any one of the at least two energy branches.

3. The hybrid propulsion system according to claim 1, wherein each of electrical energy storage assemblies of the two energy branches deliver a smoothing power of 50 kW.

4. The hybrid propulsion system according to claim 3, wherein the first electricity generator is able to deliver an electrical power of 400 KW and the second electricity generator is able to deliver an electrical power of 300 kW.

5. The hybrid propulsion system according to claim 1, wherein each of the electrical energy storage assemblies supplies a determined power corresponding to the power delivered by the electricity generator of the combustion engine to which this electrical energy storage assembly is associated.

6. The hybrid propulsion system according to claim 2, wherein the additional electrical energy storage assembly supplies a determined power corresponding to the power delivered by the electricity generator having the lower power.

7. The hybrid propulsion system according to claim 1, wherein the electrical energy storage assemblies are rechargeable.

8. The hybrid propulsion system according to claim 1, wherein the electrical power and distribution unit includes AC-DC converters for converting the alternating current delivered by the electricity generators into direct current, DC-AC converters for converting direct current into alternating current for supplying power to the electric motors, and a contactor array for connecting the electricity generators and/or the electrical energy storage assemblies to the electric thrusters according to the pre-established flight phase.

9. The hybrid propulsion system according to claim 1, wherein the combustion engine is a gas turbine or any other internal combustion engine of the piston or rotary type driving the electricity generator via a free or linked turbine.

10. The hybrid propulsion system according to claim 1, wherein the electrical energy storage assembly is a fuel battery or, if it is rechargeable, a battery and/or super-capacitor unit.

11. A hybrid VTOL aircraft including a hybrid propulsion system according to claim 1.

* * * * *